(12) United States Patent
Wu et al.

(10) Patent No.: US 11,915,064 B2
(45) Date of Patent: Feb. 27, 2024

(54) HIGHLY CONCURRENT AND RESPONSIVE APPLICATION PROGRAMMING INTERFACE (API) IN EVENTUAL CONSISTENCY ENVIRONMENT

(71) Applicant: VMware LLC, Palo Alto, CA (US)

(72) Inventors: Yu Wu, Shanghai (CN); Jin Feng, Shanghai (CN); Sifan Liu, Shanghai (CN); Zhiliang Zhang, Shanghai (CN); Kai-chia Chen, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/651,454

(22) Filed: Feb. 17, 2022

(65) Prior Publication Data

US 2023/0229527 A1    Jul. 20, 2023

(30) Foreign Application Priority Data

Jan. 19, 2022    (WO) ................ PCT/CN2022/072743

(51) Int. Cl.
  *G06F 9/54*    (2006.01)
  *G06F 9/50*    (2006.01)

(52) U.S. Cl.
  CPC .............. *G06F 9/541* (2013.01); *G06F 9/505* (2013.01); *G06F 9/5072* (2013.01); *G06F 9/547* (2013.01)

(58) Field of Classification Search
  CPC ........ G06F 9/541; G06F 9/505; G06F 9/5072; G06F 9/547
  See application file for complete search history.

(56) References Cited

U.S. PATENT DOCUMENTS

| | | | |
|---|---|---|---|
| 2013/0246944 A1* | 9/2013 | Pandiyan .............. | H04L 67/568 715/760 |
| 2017/0302755 A1* | 10/2017 | Mathew .............. | G06F 16/9574 |
| 2019/0230169 A1* | 7/2019 | Elangovan .............. | H04L 67/01 |
| 2021/0067600 A1* | 3/2021 | Gupta ...................... | G06F 9/547 |
| 2022/0083447 A1* | 3/2022 | Cirone .................... | H04L 67/02 |
| 2022/0318279 A1* | 10/2022 | Czymontek ....... | G06F 16/24539 |

* cited by examiner

*Primary Examiner* — Brian W Wathen
(74) *Attorney, Agent, or Firm* — King Intellectual Asset Management (57) ABSTRACT

The disclosure relates to processing application programming interface (API) requests. Embodiments include receiving, at an API wrapper, from a first caller, a first call to an API and sending the first call to the API. Embodiments include receiving, by the API wrapper, from one or more second callers, a second one or more calls to the API prior to receiving a response from the API to the first call. Embodiments include receiving, by the API wrapper, the response from the API to the first call and responding to the first call from the first caller with the response from the API to the first call. Embodiments include responding, by the API wrapper, to the second one or more calls from the one or more second callers with the response from the API to the first call without sending the second one or more calls to the API.

18 Claims, 5 Drawing Sheets

HIGHLY CONCURRENT AND RESPONSIVE APPLICATION PROGRAMMING INTERFACE (API) IN EVENTUAL CONSISTENCY ENVIRONMENT

CROSS-REFERENCE TO RELATED APPLICATION(S)

This application claims benefit of and priority to International Application No. PCT/CN2022/072743, filed Jan. 19, 2022, which is hereby assigned to the assignee hereof and hereby expressly incorporated by reference herein in its entirety as if fully set forth below and for all applicable purposes.

BACKGROUND

Application programming interfaces (APIs) are frequently used in software applications to provide various types of functionality to entities (e.g., executing processes/applications) that "call" functions of the API. For example, one application may call a function of an API provided by another application in order to request certain functionality. In many cases, an API may receive a large number of calls from a plurality of consumers (e.g., applications), sometimes concurrently.

Serving a large number of consumers via an API presents certain challenges, such as supporting a high level of concurrency (e.g., processing multiple requests concurrently) and avoiding excessive delays in responding. For instance, computing systems processing API calls using conventional techniques may become overloaded if a large number of calls are received in a short amount of time, and may be unable to provide responses quickly enough to support real-time functionality (e.g., consumers may be unable to rely on API responses to make real-time determinations).

Existing techniques for addressing these challenges include utilizing a lock to ensure that all incoming calls are executed sequentially, using load balancing to distribute calls to different nodes, and using a cache alone to store API responses. However, each of these techniques has certain drawbacks. For example, utilizing a lock increases the average response time, particularly for the last requestor in a sequential list. Load balancing, while it may result in a faster response time, consumes a significant amount of computing resources across a combined plurality of nodes. Utilizing a cache alone according to existing techniques requires additional complex code for keeping the cache up to date, which may be a difficult and resource-consuming process.

Accordingly, there is a need in the art for improved techniques for processing API calls in order to provide high concurrency and low latency.

SUMMARY

A method of processing application programming interface (API) requests. The method includes: receiving, at an API wrapper, from a first caller, a first call to a function provided by an API; sending, by the API wrapper, the first call to the API; receiving, by the API wrapper, from one or more second callers, a second one or more calls to the function provided by the API prior to receiving, by the API wrapper, a response from the API to the first call; receiving, by the API wrapper, the response from the API to the first call; responding, by the API wrapper, to the first call from the first caller with the response from the API to the first call; and responding, by the API wrapper, to the second one or more calls from the one or more second callers with the response from the API to the first call without sending, by the API wrapper, the second one or more calls to the API.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for highly concurrent and responsive application programming interface (API) request processing. According to certain embodiments, an API wrapper is configured to receive requests directed to an API. An API wrapper generally serves as a layer of abstraction in front of an underlying API, receiving calls directed to the underlying API and processing the calls according to certain logic. Techniques described herein involve an API wrapper that reduces a number of calls to an underlying API by sending a single call to the underlying API and providing a single response received from the API to all callers that issue calls during a given time interval (e.g., during the execution time of the single call to the underlying API).

In a particular embodiment, as described in more detail below with respect to FIG. 2, an API wrapper receives a first call to an API function from a caller (e.g., an application) and sends the first call to an underlying API. Subsequently, while waiting for a response to the first call from the underlying API, the API wrapper adds any additional calls to the API function (e.g., received during a given time interval following the first call) to a queue. Then, upon receiving the response from the underlying API, the API wrapper provides the response to the first call to all of the callers, thereby responding to all of the calls in the queue.

Furthermore, as described in more detail below with respect to FIG. 3, in some embodiments the API wrapper utilizes a cache in a manner different than existing solutions in conjunction with the techniques herein to ensure higher availability and a faster response time. For example, once the API wrapper receives a response to an API call from the underlying API, the API wrapper may add the response to a cache. The API wrapper may then provide the cached response to any subsequent callers if a more up-to-date response cannot be obtained from the underlying API within a certain time period (e.g., if a subsequent API request times out). When an updated response is ultimately received from the underlying API (e.g., after the time period), the updated response may be added to the cache.

Techniques described herein constitute an improvement to the technical field of API request processing by reducing calls to an underlying API (e.g., providing a single call to an underlying API on behalf of multiple calls), thereby reducing resource utilization of the underlying API, such as memory and processor resources. For example, as described in more detail below with respect to FIG. 1, conventional API request processing techniques may result in calls failing due to resource unavailability (e.g., from overloading the computing devices that process API requests) or API timeouts, and thus may result in poor functionality or unreliability of APIs. By utilizing an API wrapper that places related API calls into a queue and provides a single call to an underlying API on behalf of all of the related calls received during a time interval, embodiments of the present disclosure significantly reduce load on the underlying API and thereby improve the functioning of the computing devices involved and the responsiveness and scalability of the API. Furthermore, by utilizing a cache, certain embodiments of the present disclosure provide improved response times and ensured data availability even in cases where an underlying API is slow to respond.

Figure 1:
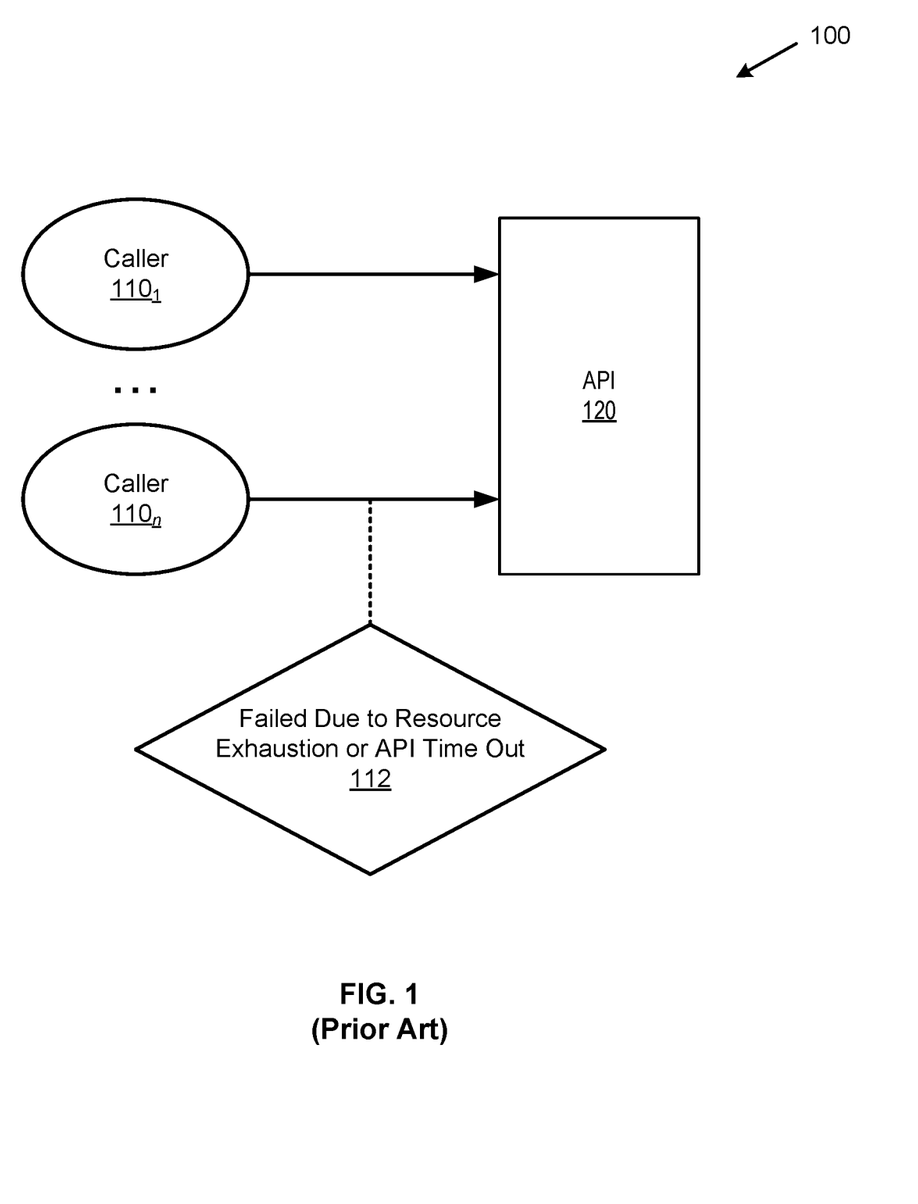
FIG. 1 is an illustration of existing techniques for processing API requests.

FIG. 1 is an illustration 100 of existing techniques for processing API requests. Issues described with respect to FIG. 1 are addressed through improved techniques described herein (e.g., with respect to FIGS. 2-5).

Illustration 100 includes an API 120, which generally provides various functions that can be invoked in order to initiate particular types of functionality. In one particular example, as described in more detail below with respect to FIG. 4, API 120 provides functions related to monitoring and analyzing system health metrics with respect to a plurality of computing components in a distributed computing system. In certain embodiments, API 120 is a slow, un-stable, and resource-consuming API, such as due to reliance on multiple separate components (e.g., with separate APIs), which may be accessed via network communication.

A plurality of callers $110_{1-n}$, (referred to collectively as callers 110 and individually as caller 110), which may be services running on one or more computing systems, issue calls to API 120. However, API 120 may be unable to handle all of these calls concurrently within a given time window, such as due to limited availability of processing, memory, and/or network communication resources, slow response times of external components with which API 120 interacts when processing calls, and/or the like. Therefore, as shown at step 112, one or more of the calls from callers 110 may fail due to computing resource exhaustion (e.g., unavailability of physical computing resources such as processing, memory, and/or network communication resources) and/or API time outs (e.g., failure of API 120 to determine a response to a call within a given time window). Accordingly, one or more of callers 110 may not receive a successful response from API 120.

Techniques described herein address these issues through the use of an API wrapper, as described below.

Figure 2:
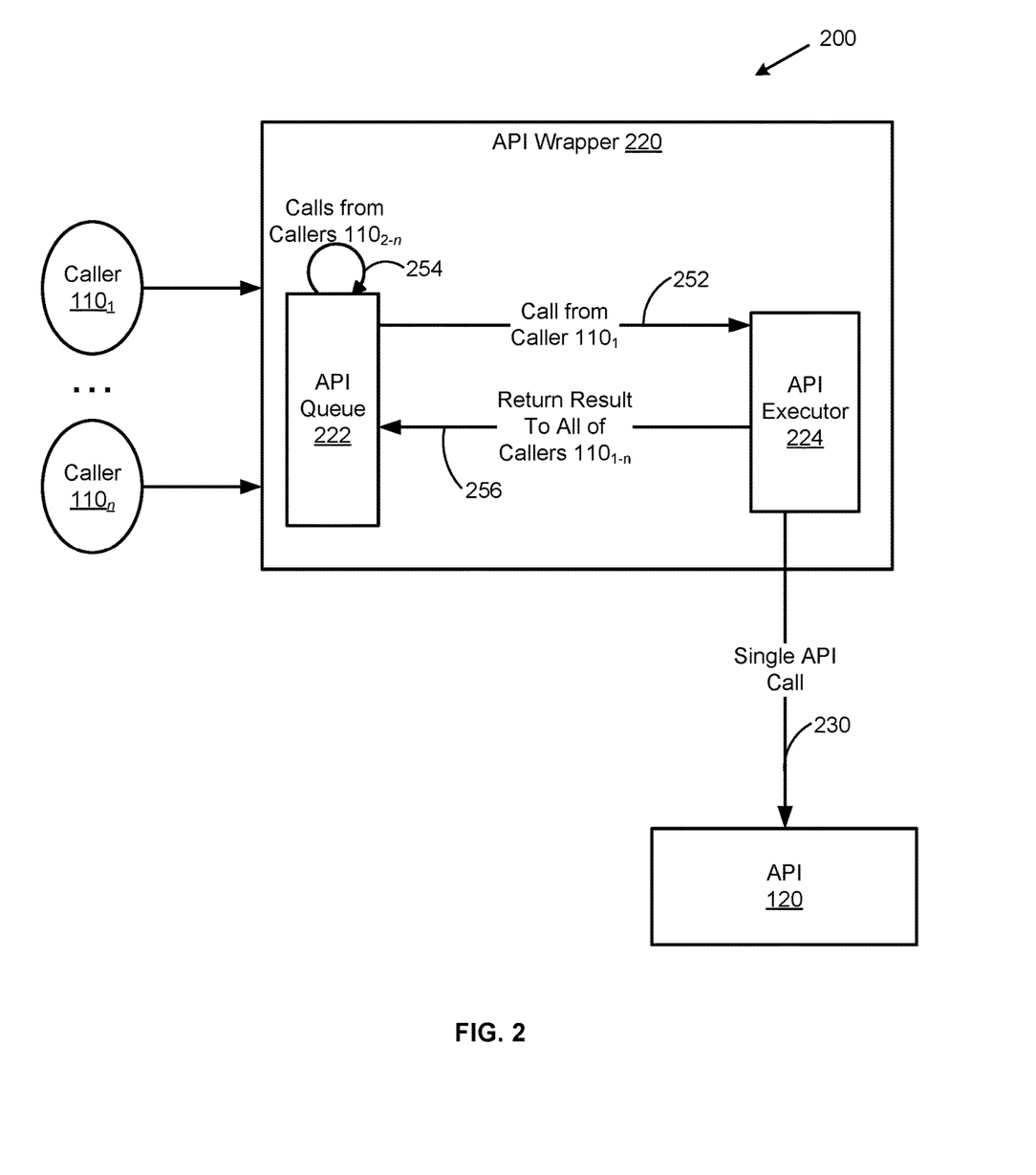
FIG. 2 is an illustration of an example technique for highly concurrent and responsive API request processing.

FIG. 2 is an illustration 200 of an example technique for highly concurrent and responsive API request processing. Illustration 200 includes API 120 and callers 110 of FIG. 1.

API wrapper 220 provides a layer of abstraction in front of API 120 in order to provide a high level of concurrency and a low-latency response time. API wrapper 220 generally represents a software component that can be added to existing or newly developed APIs in order to provide improved API request processing. API wrapper 220 may be located on the same computing device as API 120 or a separate computing device (e.g., connected via a network to a computing device on which API 120 is located).

API wrapper 220 receives calls from callers 110 directed to API 120. For example, API wrapper 220 may be configured to receive calls directed to a uniform resource identifier (URI) of API 120. In other embodiments, callers 110 may direct API calls to a URI of API wrapper 220 directly.

The calls from callers 110, representing a series of calls to a particular function of API 120, are received at an API queue 222. The first call from caller $110_1$ is provided to an API executor 224, which sends a single API call at step 230 to API 120. The rest of the calls from callers $110_{2-n}$ (e.g., calls to the particular function that are received while API executor 224 awaits a response from API 120 to the single API call sent at step 230) are added to API queue 222 at step 254.

Once API executor 224 receives a response from API 120 to the single API call sent at step 230, API executor 224 returns the response to all of callers 110 at step 256 (e.g., via API queue 222). For example, the response may be returned to caller $110_1$ and then to callers $110_{2-n}$ in the order in which they appear in API queue 222 (e.g., corresponding to the order in which they were received by API wrapper 220). In certain aspects, the response may be multicast or broadcast to each of the callers 110. Thus, all of callers 110 receive a response from API 120 without requiring API 120 to process multiple calls.

Once the response has been provided to all of callers 110, the next call to the particular function of API 120 received by API wrapper 220 from a caller will again be provided as a single API call to API 120 (e.g., repeating the process described above with respect to callers 110). The response from API 120 to that call, when received by API wrapper 220, will be provided to the caller and to all other callers who call that particular function while API wrapper 220 was waiting for the response.

Embodiments of the present disclosure provide a consistent response time for all concurrent callers. For instance, if the single API call sent to API 120 at step 230 take time T1 to complete, then the response time for all of callers 110 will be approximately T1. Furthermore, techniques described herein allow for supporting a large number of concurrent calls without excessive amounts of resource consumption and while providing up to date responses.

In illustration 200, callers $110_{1-n}$ represent a series of calls to a particular API function having a particular set of input parameters. API wrapper 220 may only return a single API response to multiple callers if all of the callers requested the same functionality from the API (e.g., the same function with the same input parameters). Thus, the process described herein with respect to callers 110 is performed separately for each group of calls to any given function having the same input parameters.

Techniques described herein may be performed in an eventual consistency system. Eventual consistency is a guarantee that when an update is made in a distributed data store, that update will eventually be reflected in all nodes that store the data, resulting in the same response every time the data is queried. With eventual consistency, results may potentially by less consistent early on, but are provided more quickly with low latency. For example, while sending the call from caller $110_n$ to API 120 independently may potentially result in a more updated result than that returned in response to caller $110_1$, the result will be returned more quickly using techniques described herein while still providing eventual consistency.

Figure 3:
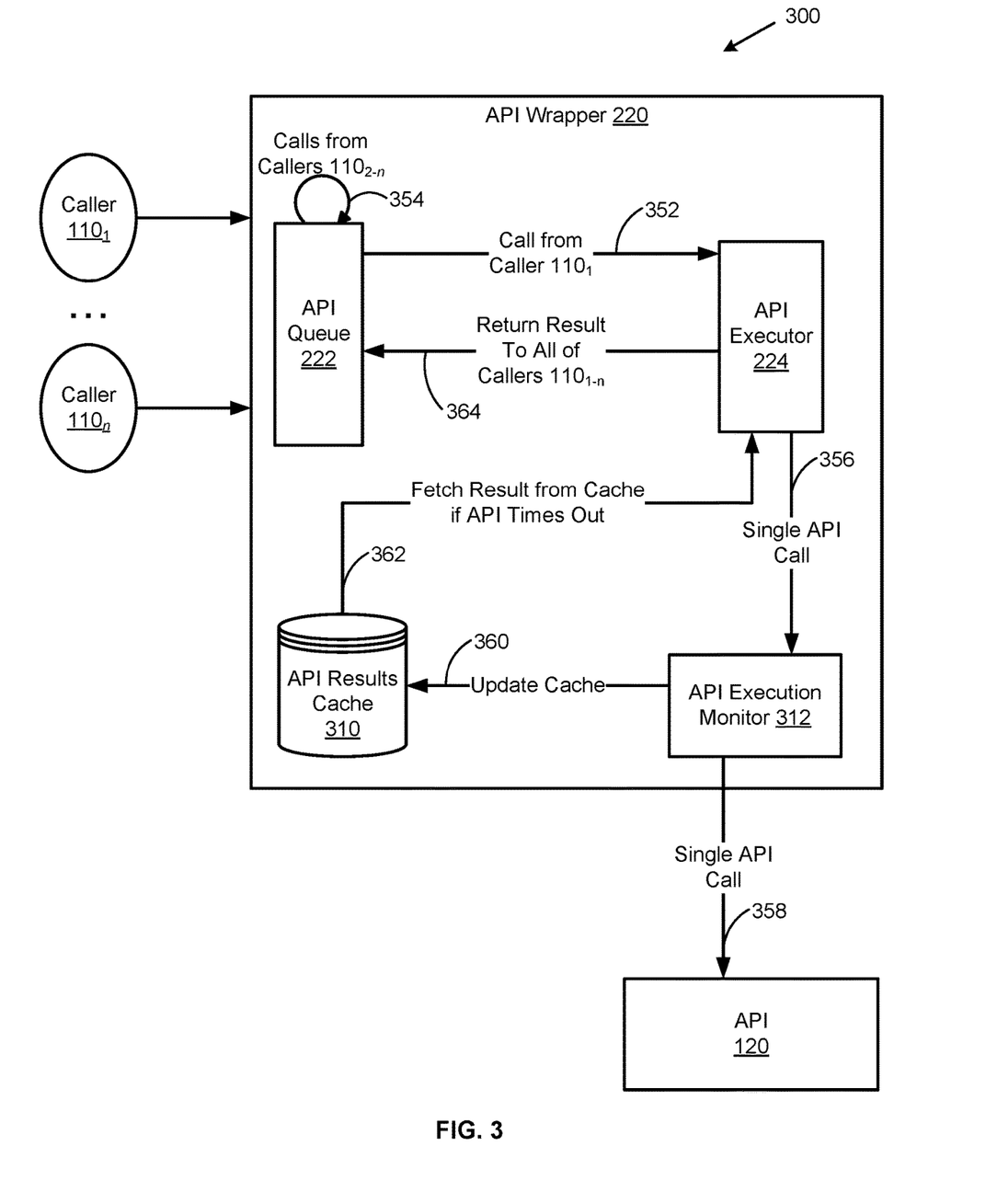
FIG. 3 is an illustration of another example technique for highly concurrent and responsive API request processing.

FIG. 3 is an illustration 300 of another example technique for highly concurrent and responsive API request processing. Illustration 300 comprises API 120, API wrapper 220, API queue 222, API executor 224, and callers 110 of FIG. 1.

Furthermore, in illustration 300, API wrapper 220 comprises an API execution monitor 312 and an API results cache 310 in order to provide additional benefits. Similar to the process described above with respect to FIG. 2, API wrapper 220 receives calls from callers 110 to a particular function of API 120. API queue 222 provides the call from caller $110_1$ to API executor 224 at step 352 and adds the calls from callers $110_{2-n}$ to API queue 222 at step 354.

At step 356, API executor 224 provides a single API call based on the call from caller $110_1$ to API execution monitor 312, and API execution monitor 312 issues a corresponding single API call to API 120 at step 358. API execution monitor 312 monitors API 120 for a response to the single API call and, upon receiving a response, updates API results cache 310 with the response at step 360. Once API results cache 310 has been populated, it may be used to provide responses to subsequent callers in the event of an API time out. For example, if there is a previously stored response in API results cache 310 and the single API call sent at step 358 times out (e.g., a threshold amount of time passes without a response from API 120), then the previously stored response is fetched from API results cache 310 at step 362.

API executor 224 provides the response (either received from API 120 in response to the single API call sent at step 358 or fetched from API results cache 310 at step 362) to all of callers 110 at step 364.

If the single API call sent at step 358 times out and a cached result is fetched, the single API call is still processed and API execution monitor 312 eventually receives a response from API 120 (e.g., after the threshold amount of time has passed). When the response is eventually received, API execution monitor 312 updates API results cache 310 with the response for use in responding to subsequent calls as needed.

Utilizing API results cache 310 as described herein allows a response to be returned to all callers even in the event of an API time out for a single API call, while keeping the contents of the cache current by updating the cache with API responses that are received even after a time out occurs. Thus, real-time responses that are substantively up to date may be provided to callers even in the event of a slow backend system (e.g., database or other endpoint with which the API communicates), slow network connection, large volume of calls, and/or the like. Furthermore, utilizing API results cache 310 to provide responses to callers when a threshold amount of time has passed allows for a guaranteed response time regardless of the time API 120 takes to process a call. As such, techniques described herein may allow for compliance with service level agreements (SLAs), which are commitments between service providers and customers regarding the availability and quality of services that are to be provided. For example, if an SLA requires a certain API response time, embodiments of the present disclosure allow a service provider to ensure that this API response time is not exceeded by providing a cached response in the event that the API does not respond during that time while still providing an up to date result.

By updating API results cache 310 as part of the ordinary API call processing path based on every call submitted to API 120 (which may be a limited number of calls due to the queue logic described herein), techniques described herein avoid the additional complex code that is conventionally required to keep a cache up to date.

API results cache 310 may store a current response value for each combination of input parameters for each function of API 120. Thus, the process described herein with respect to FIG. 3 may be performed independently for each combination of input parameters for each function of API 120. In some embodiments, each given function and input parameter combination may have a separate thread or instance of API execution monitor 312 that manages submitting and returning responses to and from calls to API 120 and updating API results cache 310 for the given function and input parameter combination. In other embodiments, a single thread or instance of API execution monitor 312 manages all function and input parameter combinations.

Figure 4:
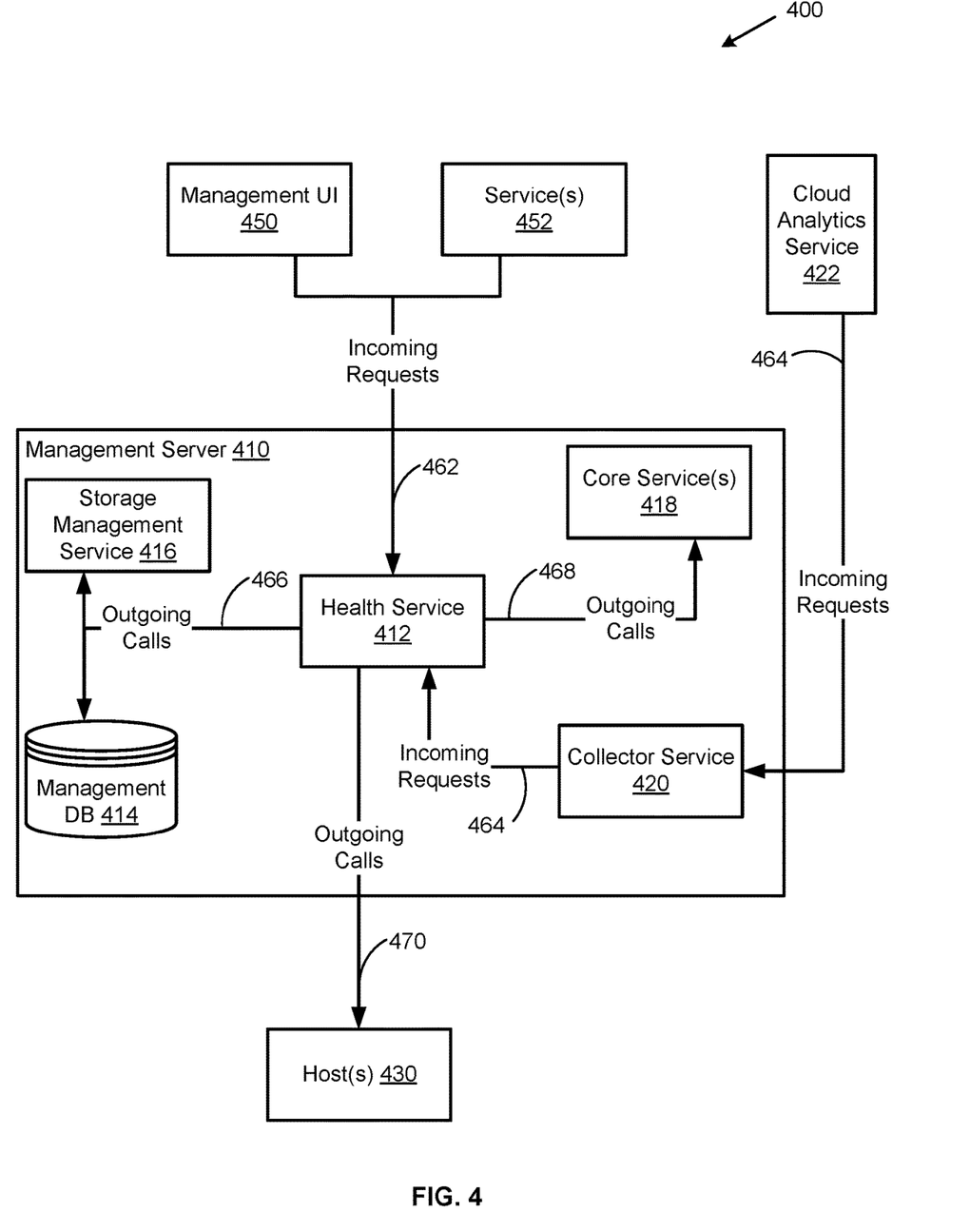
FIG. 4 is an illustration of an example computing environment in which embodiments of the present disclosure may be implemented.

FIG. 4 is an illustration 400 of an example computing environment in which embodiments of the present disclosure may be implemented.

Illustration 400 includes a management server 410, which may be a computing device that performs management functions with respect to a computing environment. For example, management server 410 may receive configuration inputs from a user (e.g., an administrator) related to various physical and/or virtual computing components via a management user interface 450. In certain embodiments, management server 410 represents a management plane of a software defined data center (SDDC).

An SDDC involves a plurality of hosts (e.g., host(s) 430) in communication over a physical network infrastructure of a datacenter (e.g., an on-premise datacenter or a cloud datacenter). Each host has one or more virtualized endpoints such as virtual machines (VMs), containers, or other virtual computing instances (VCIs). These VCIs may be connected across the multiple hosts in a manner that is decoupled from the underlying physical network, which may be referred to as an underlay network. The VCIs may be connected to one or more logical overlay networks that may span multiple hosts. The underlying physical network and the one or more logical overlay networks may use different addressing.

Host(s) 430 may comprise one or more physical computing devices, such as host computers that host VCIs. A health service 412 on management server 410 monitors health of computing components in the computing environment, such as performance metrics and operating status information of host(s) 430, VCIs and/or services running on host(s) 430, underlay networks, logical overlay networks, logical storage systems, and/or the like.

Health service 412 provides an API that allows callers to invoke health monitoring/management functionality. For example, a function of an API provided by health service 412 may allow a caller to request data about the performance and/or operating status of particular computing components. Health service 412 may rely on various sources when responding to API calls, such as the hosts(s) 430, storage policy management service 416, management database (DB) 414, and core service(s) 418. For example, health service 412 may send outgoing calls to these various components (e.g., to separate APIs provided by these components or to local agents of the API provided by health service 412 on these components) to retrieve information for use in responding to API calls. An example of an API function provided by health service 412 is a "cluster level health status" function with an input parameter indicating whether the call is for an "upgrade pre-check." A cluster-level health status call that is an upgrade pre-check may comprise a request for a subset of all health data of a cluster of hosts 430 that is relevant to a software or hardware upgrade process (e.g., including health status information of key components such as virtual disks, hosts, and networks) and not health data of the cluster that is not directly related to the upgrade process (e.g., memory utilization data from the hosts). A cluster-level health status call that is not an upgrade pre-check may comprise a request for all health data of the cluster of hosts 430, including memory utilization data.

Storage management service 416 generally performs management functions with respect to storage objects, such as virtual disks. For example, storage management service 416 may provide information to health service 412 about health of storage objects (e.g., information about whether computing devices on which storage objects are implemented are functioning properly and/or are accessible over a network, information about allocated and/or available memory of storage objects, and/or the like). Management DB 414 is a data storage entity that stores data related to management server 410, such as related to implementation of configuration information (e.g., indicating which hosts certain VCIs are located on, network topology information, and/or the like). Core service(s) 418 include one or more services that perform functions related to management of the computing environment, such as an inventory service (e.g., providing information about objects implemented in the computing environment), an alarm service (e.g., providing information about whether alarm conditions are triggered), a statistics logging service (e.g., for monitoring and/or analyzing statistical data related to deployment and performance of computing components), and/or the like.

At steps 462 and 464, health service 412 receives incoming requests (e.g., API calls) from management UI 450, one or more services 452, and cloud analytics service 422 (via a collector service 420 on management server 410).

Management UI 450 may generate API calls in response to user input, such as requesting particular system health data (e.g., information about latency on a particular logical network). While management UI 450 is shown separate from management server 410 (for illustration purposes), management UI 450 may be part of management server 410.

One or more services 452 may generate API calls for various reasons. For example, a service 452 may be a load balancing service that requests data about processor and/or memory utilization on hosts 430 in order to determine an optimal distribution of workloads. One or more of service(s) 452 may be located on one or more of host(s) 430.

Cloud analytics service 422 may be a service that runs on a computing device accessible over a network (e.g., located remotely from management server 410 and/or host(s) 430), such as over the internet, and performs analysis of health data (e.g., to identify trends, predict failures or other issues, recommend configuration changes, and/or the like). Collector service 420 on management server 410 may listen for and "collect" API calls from external networks such as the internet (e.g., including calls from cloud analytics service 422).

In processing the incoming requests to the API, health service 412 may issue outgoing calls (e.g., at steps 466, 468, and 470) to various components such as storage management service 416, management DB 414, core service(s) 418, and/or host(s) 430. For example, in order to respond to an API from cloud analytics service 422 requesting data about overall system health, health service 412 may need data and/or analysis from one or more of these components.

Due to the potentially large number of backend components upon which health service 412 may rely in processing API calls and the potentially large number of API calls that may be received in a distributed computing environment such as that described herein, embodiments of the present disclosure may be used to improve the concurrency and responsiveness of the API provided by health service 412.

For example, an API wrapper such as described above with respect to FIGS. 2 and 3 may be added to the API of health service 412 in order to reduce the number of calls processed by the API, improve response time, conserve resources, and/or ensure that all callers receive responses that are substantively up to date in a consistent and reasonable amount of time. For instance, API wrapper 220 and API 120 of FIGS. 2 and/or 3 may be included within management server 410 (e.g., within and/or associated with health service 412), and may provide queueing and/or caching functionality as described above.

It is noted that the example described with respect to FIG. 4 is not limiting, and techniques described herein may implemented in a variety of different computing contexts. For instance, an API wrapper as described herein may be added to many different APIs regardless of the underlying functionality provided by the API.

Figure 5:
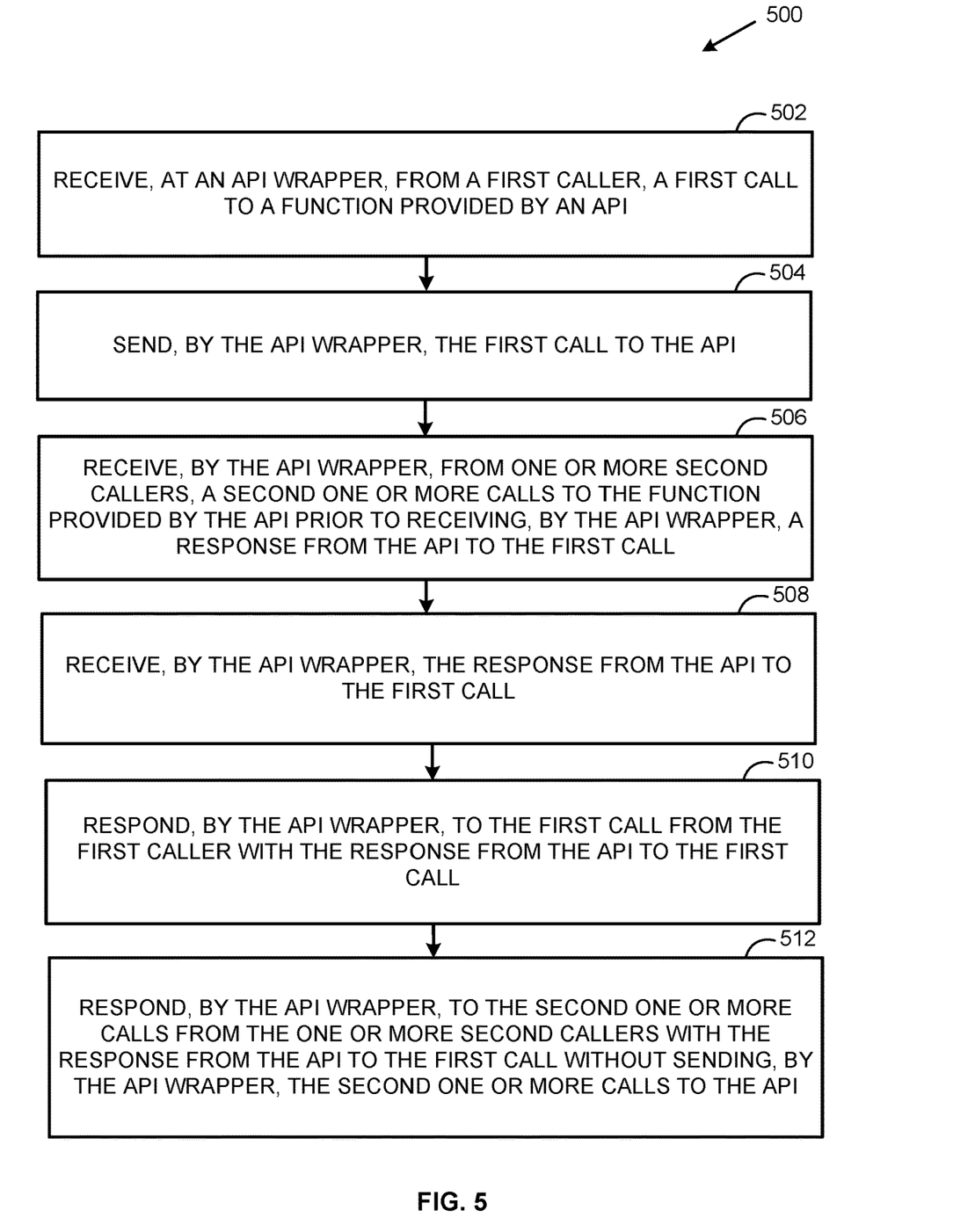
FIG. 5 depicts example operations related to processing API requests according to embodiments of the present disclosure.

FIG. 5 illustrates example operations 500 related to processing API requests according to embodiments of the present disclosure. For example, operations 500 may be performed by API wrapper 220 of FIGS. 2 and/or 3.

Operations 500 begin at step 502, with receiving, at an API wrapper, from a first caller, a first call to a function provided by an API.

Operations 500 continue at step 504, with sending, by the API wrapper, the first call to the API.

Operations 500 continue at step 506, with receiving, by the API wrapper, from one or more second callers, a second one or more calls to the function provided by the API prior to receiving, by the API wrapper, a response from the API to the first call. Some embodiments further comprise adding, by the API wrapper, the second one or more calls to a queue while waiting for the response from the API to the first call.

In certain embodiments, the first call and the second one or more calls comprise a common set of input parameters to the function.

Operations 500 continue at step 508, with receiving, by the API wrapper, the response from the API to the first call.

Operations 500 continue at step 510, with responding, by the API wrapper, to the first call from the first caller with the response from the API to the first call.

Operations 500 continue at step 512, with responding, by the API wrapper, to the second one or more calls from the one or more second callers with the response from the API to the first call without sending, by the API wrapper, the second one or more calls to the API.

Some embodiments further comprise storing, by the API wrapper, the response from the API to the first call in a cache. Certain embodiments further comprise receiving, by the API wrapper, from a third caller, a third call to the function provided by the API and sending, by the API wrapper, the third call to the API. Some embodiments further comprise determining, by the API wrapper, that a time period has elapsed without receiving a corresponding response from the API to the third call and responding, by the API wrapper, based on the time period elapsing, to the third call from the third caller with the response from the API to the first call from the cache.

Certain embodiments further comprise receiving, by the API wrapper, from a fourth caller, a fourth call to the function provided by the API prior to receiving, by the API wrapper, the corresponding response from the API to the third call, determining, by the API wrapper, that the time period has elapsed since receiving the fourth call without receiving the corresponding response from the API to the third call, and responding, by the API wrapper, based on the time period elapsing since receiving the fourth call, to the fourth call from the fourth caller with the response from the API to the first call from the cache.

Some embodiments further comprise receiving, by the API wrapper, the corresponding response from the API to the third call after responding the third call from the third caller with the response from the API to the first call from the cache, and updating, by the API wrapper, the cache based on the corresponding response from the API to the third call.

Certain embodiments further comprise receiving, by the API wrapper, from an additional caller, an additional call to the function provided by the API prior to receiving, by the API wrapper, the response from the API to the first call, wherein the additional call comprises input values to the function that are different than the common set of input values to the function, and sending, by the API wrapper, the additional call to the API without waiting for the response from the API to the first call.

Some embodiments further comprise receiving, by the API wrapper, from an additional caller, an additional call to a different function provided by the API prior to receiving, by the API wrapper, the response from the API to the first call, and sending, by the API wrapper, the additional call to the API without waiting for the response from the API to the first call.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of processing application programming interface (API) requests, comprising:
   receiving, at an API wrapper, from a first caller, a first call to a function provided by an API;
   sending, by the API wrapper, the first call to the API;
   receiving, by the API wrapper, from one or more second callers, a second one or more calls to the function provided by the API prior to receiving, by the API wrapper, a response from the API to the first call;
   receiving, by the API wrapper, the response from the API to the first call;
   storing, by the API wrapper, the response from the API to the first call in a cache;
   responding, by the API wrapper, to the first call from the first caller with the response from the API to the first call; and
   responding, by the API wrapper, to the second one or more calls from the one or more second callers with the response from the API to the first call in the cache, without sending, by the API wrapper, the second one or more calls to the API;
   receiving, by the API wrapper, from a third caller, a third call to the function provided by the API; and
   responding, by the API wrapper, based on a time period elapsing, to the third call from the third caller with the response from the API to the first call from the cache.

2. The method of claim 1, further comprising adding, by the API wrapper, the second one or more calls to a queue while waiting for the response from the API to the first call.

3. A method of processing application programming interface (API) requests, comprising:
   receiving, at an API wrapper, from a first caller, a first call to a function provided by an API;
   sending, by the API wrapper, the first call to the API;
   storing, by the API wrapper, a response from the API to the first call in a cache;
   receiving, by the API wrapper, from a second caller, a second call to the function provided by the API;
   sending, by the API wrapper, the second call to the API;
   determining, by the API wrapper, that a time period has elapsed without receiving a corresponding response from the API to the second call; and
   responding, by the API wrapper, based on the time period elapsing, to the second call from the second caller with the response from the API to the first call from the cache.

4. The method of claim 3, further comprising:
   receiving, by the API wrapper, from a third caller, a third call to the function provided by the API prior to receiving, by the API wrapper, the corresponding response from the API to the third call;
   determining, by the API wrapper, that the time period has elapsed since receiving the third call without receiving the corresponding response from the API to the third call; and
   responding, by the API wrapper, based on the time period elapsing since receiving the third call, to the third call from the third caller with the response from the API to the first call from the cache.

5. The method of claim 3, further comprising:
   receiving, by the API wrapper, the corresponding response from the API to the second call after responding the second call from the second caller with the response from the API to the first call from the cache; and
   updating, by the API wrapper, the cache based on the corresponding response from the API to the second call.

6. The method of claim 1, wherein the first call and the second one or more calls comprise a common set of input parameters to the function.

7. The method of claim 6, further comprising:
   receiving, by the API wrapper, from an additional caller, an additional call to the function provided by the API prior to receiving, by the API wrapper, the response from the API to the first call, wherein the additional call comprises input values to the function that are different than the common set of input values to the function; and
   sending, by the API wrapper, the additional call to the API without waiting to receive the response from the API to the first call.

8. The method of claim 1, further comprising:
   receiving, by the API wrapper, from an additional caller, an additional call to a different function provided by the API prior to receiving, by the API wrapper, the response from the API to the first call; and
   sending, by the API wrapper, the additional call to the API without waiting to receive the response from the API to the first call.

9. A system for processing application programming interface (API) requests, the system comprising:
   at least one memory; and
   at least one processor coupled to the at least one memory, the at least one processor and the at least one memory configured to:
      receive, at an API wrapper, from a first caller, a first call to a function provided by an API;
      send, by the API wrapper, the first call to the API;
      receive, by the API wrapper, from one or more second callers, a second one or more calls to the function provided by the API prior to receiving, by the API wrapper, a response from the API to the first call;
      receive, by the API wrapper, the response from the API to the first call;

store, by the API wrapper, the response from the API to the first call in a cache;
respond, by the API wrapper, to the first call from the first caller with the response from the API to the first call; and
respond, by the API wrapper, to the second one or more calls from the one or more second callers with the response from the API to the first call in the cache without sending, by the API wrapper, the second one or more calls to the API;
receive, by the API wrapper, from a third caller, a third call to the function provided by the API; and
respond, by the API wrapper, based on a time period elapsing, to the third call from the third caller with the response from the API to the first call from the cache.

10. The system of claim 9, wherein the at least one processor and the at least one memory are further configured to add, by the API wrapper, the second one or more calls to a queue while waiting for the response from the API to the first call.

11. A system for processing application programming interface (API) requests, the system comprising:
at least one memory; and
at least one processor coupled to the at least one memory, the at least one processor and the at least one memory configured to:
receive, at an API wrapper, from a first caller, a first call to a function provided by an API;
send, by the API wrapper, the first call to the API;
store, by the API wrapper, a response from the API to the first call in a cache;
receive, by the API wrapper, from a second caller, a second call to the function provided by the API;
send, by the API wrapper, the second call to the API;
determine, by the API wrapper, that a time period has elapsed without receiving a corresponding response from the API to the second call; and
respond, by the API wrapper, based on the time period elapsing, to the second call from the second caller with the response from the API to the first call from the cache.

12. The system of claim 11, wherein the at least one processor and the at least one memory are further configured to:
receive, by the API wrapper, from a third caller, a third call to the function provided by the API prior to receiving, by the API wrapper, the corresponding response from the API to the third call;
determine, by the API wrapper, that the time period has elapsed since receiving the third call without receiving the corresponding response from the API to the third call; and
respond, by the API wrapper, based on the time period elapsing since receiving the third call, to the third call from the fourth caller with the response from the API to the first call from the cache.

13. The system of claim 11, wherein the at least one processor and the at least one memory are further configured to:
receive, by the API wrapper, the corresponding response from the API to the second call after responding the second call from the third caller with the response from the API to the first call from the cache; and update, by the API wrapper, the cache based on the corresponding response from the API to the second call.

14. The system of claim 9, wherein the first call and the second one or more calls comprise a common set of input parameters to the function.

15. The system of claim 14, wherein the at least one processor and the at least one memory are further configured to:
receive, by the API wrapper, from an additional caller, an additional call to the function provided by the API prior to receiving, by the API wrapper, the response from the API to the first call, wherein the additional call comprises input values to the function that are different than the common set of input values to the function; and
send, by the API wrapper, the additional call to the API without waiting to receive the response from the API to the first call.

16. The system of claim 9, wherein the at least one processor and the at least one memory are further configured to:
receive, by the API wrapper, from an additional caller, an additional call to a different function provided by the API prior to receiving, by the API wrapper, the response from the API to the first call; and
send, by the API wrapper, the additional call to the API without waiting to receive the response from the API to the first call.

17. A non-transitory computer-readable medium storing instructions that, when executed by one or more processors, cause the one or more processors to:
receive, at an API wrapper, from a first caller, a first call to a function provided by an API;
send, by the API wrapper, the first call to the API;
store, by the API wrapper, a response from the API to the first call in a cache;
receive, by the API wrapper, from a second caller, a second call to the function provided by the API;
send, by the API wrapper, the second call to the API;
determine, by the API wrapper, that a time period has elapsed without receiving a corresponding response from the API to the second call; and
respond, by the API wrapper, based on the time period elapsing, to the second call from the second caller with the response from the API to the first call from the cache.

18. The non-transitory computer-readable medium of claim 17, wherein the instructions, when executed by the one or more processors, further cause the one or more processors to:
receive, by the API wrapper, from a third caller, a third call to the function provided by the API prior to receiving, by the API wrapper, the corresponding response from the API to the third call;
determine, by the API wrapper, that the time period has elapsed since receiving the third call without receiving the corresponding response from the API to the third call; and
respond, by the API wrapper, based on the time period elapsing since receiving the third call, to the third call from the fourth caller with the response from the API to the first call from the cache.

* * * * *